United States Patent [19]

Mitchell et al.

[11] 4,426,284
[45] Jan. 17, 1984

[54] FILTER CONDITION INDICATOR

[75] Inventors: Samuel S. Mitchell, Monroeville; Abbas F. Vijlee, Pittsburgh, both of Pa.

[73] Assignee: Schroeder Brothers Corporation, McKees Rocks, Pa.

[21] Appl. No.: 463,499

[22] Filed: Feb. 3, 1983

[51] Int. Cl.³ .............................................. B01D 27/10
[52] U.S. Cl. ........................................ 210/90; 210/91; 210/234; 210/235
[58] Field of Search .................... 210/90, 91, 234, 235

[56] References Cited

U.S. PATENT DOCUMENTS

| | | | |
|---|---|---|---|
| 3,150,633 | 9/1964 | Holl | 210/90 |
| 3,317,046 | 5/1967 | Raump et al. | 210/235 X |
| 3,879,289 | 4/1975 | Aspinwall et al. | 210/90 |
| 3,912,630 | 10/1975 | Reighard et al. | 210/234 |
| 4,325,824 | 4/1982 | Mitchell et al. | 210/90 |

Primary Examiner—John Adee
Attorney, Agent, or Firm—Webb, Burden, Robinson & Webb

[57] ABSTRACT

A filter comprising a filter head, a canister secured to the filter head and a tubular filter within the canister. The filter head has inlet and outlet ports for connecting into a hydraulic conduit. A first passage normally delivers fluid from the inlet port to the outer cylindrical surface of the tubular filter element. A second passage delivers fluid from the interior of the filter element to the outlet port. The filter head has a sliding element between the inlet and outlet ports. The sliding element is spring biased which bias can be overcome by differential pressure across the filter element. An indicator is associated with said sliding element and extends through the filter head to the exterior thereof. The filter head has a butterfly valve in the second passage. A plunger slidably positioned in said filter head is spring biased to a first position in which it extends into the canister in the space normally occupied by the tubular filter element. A linkage between the butterfly valve and the plunger closes the valve when the plunger is in a first position, and opens the valve when the plunger is forced in a second position by normal placement of a filter element.

2 Claims, 12 Drawing Figures

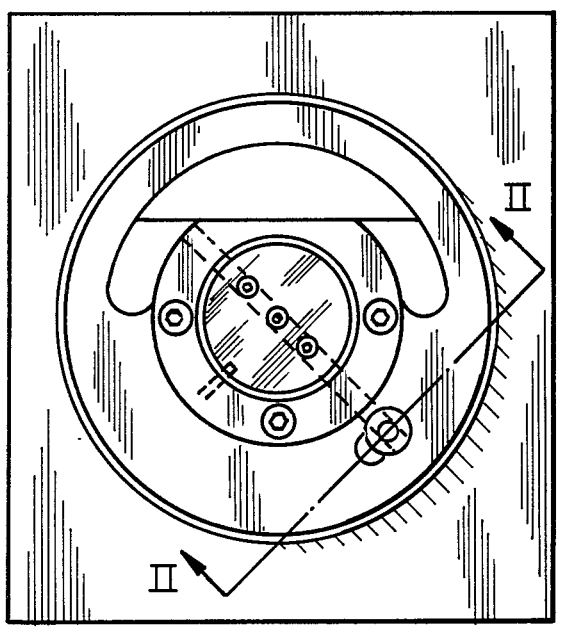
Fig. 10
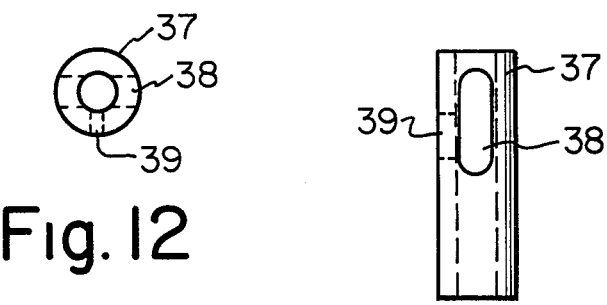
Fig. 12
Fig. 11

FILTER CONDITION INDICATOR

DESCRIPTION

Background

This invention relates to filters having dirty filter element indicators as shown, for example, in U.S. Pat. Nos. 3,150,633 and 4,325,824. A drawback with these filters is the possible misinterpretation of the filter condition indicator in the clean filter position. It may be taken as an "all is well" indication which would be erroneous when, by mistake, no filter element has been installed in the filter.

SUMMARY OF THE INVENTION

It is an advantage according to this invention to provide a filter in which the filter condition indicator will automatically indicate a dirty filter when no filter element at all is positioned within the filter.

Briefly, a filter according to this invention comprises a filter head, a canister secured to the filter head, and means for securing a tubular filter element within the canister. The filter head comprises an inlet and outlet port for connecting into the hydraulic conduit. A first passage for normally delivering fluid runs from the inlet port to the outer cylindrical surface of the tubular filter element. A second passage runs from the interior of the filter element to the outer port. The filter head has a normally closed bypass valve and a channel between the inlet and outlet ports. The bypass valve comprises a closure element that is spring biased in a closed position which bias can be overcome by a differential pressure across the filter element. An indicator is associated with the bypass valve and extends through the filter head to the exterior thereof for indicating the position of the bypass valve and thereby the condition of the filter element. The filter head comprises a butterfly valve in the second passage. A plunger is slidably positioned in said filter head spring biased to a first position which extends into the canister and the space normally occupied by the tubular filter element. A linkage between the butterfly valve and the plunger closes the valve when the plunger is in its first position and opens the valve when the plunger is forced into a second position by normal placement of a filter element within the canister.

THE DRAWINGS

Further features and other objects and advantages of this invention will become clear from the following detailed description made with reference to the drawings in which FIG. 1 is a partial section of a filter comprising a dirty filter alarm and a filter element missing feature according to this invention;

FIG. 10 is a bottom view of the filter head with a filter missing apparatus in place; and FIGS. 11 and 12 illustrate the plunger.

DESCRIPTION OF THE PREFERRED EMBODIMENTS

Figure 1:
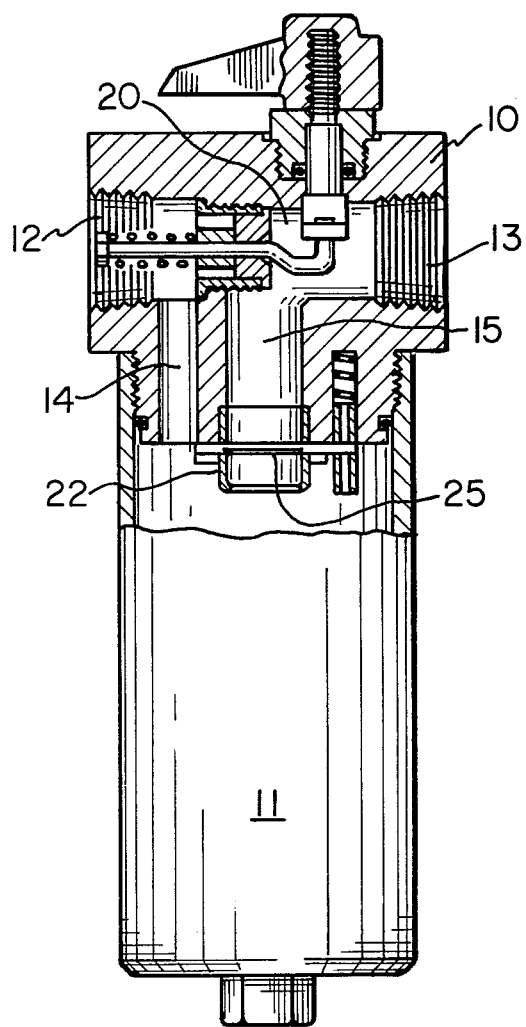

Referring now to FIG. 1, there is shown a filter with a dirty filter element indicator generally as disclosed in U.S. Pat. No. 4,325,824. The filter comprises a head 10 having a canister 11 threadably secured thereto. The head has an inlet port 12 and an outlet port 13 therein. An inlet passage 14 delivers fluid along the inner periphery of the canister from the inlet port. An outlet passage 15 receives fluid from the central portion of the canister interior and delivers it to the outlet port. The filter element (not shown) divides the volume of the canister into an inlet (outer cylindrical) portion and an outlet (inner) portion. Fluid must traverse the filter element to pass from the inlet passage 14 to the outlet passage 15.

Positioned in a bypass passage 20 extending between the inlet passage and the outlet passage is an apparatus that moves against a spring bias a distance depending upon the difference in pressure between the inlet and outlet passages. For details of such an apparatus see U.S. Pat. No. 4,325,824. The pressure between the inlet and outlet passages increases as the filter element gathers dirt from the fluid as it is intended to do. Thus the position of the apparatus in the bypass passage can be used to move an indicator to signal a dirty filter as explained in detail in U.S. Pat. No. 4,325,824. The apparatus in the bypass passage may be a bypass valve. If no filter element is within the canister, the indicator will signal a clean filter condition. A clean filter indication may be taken erroneously as an "all is well" indication when no filter element is present and the fluid passing through the filter head and canister is not being cleansed.

To add yet another indicator showing the absence of a filter element would require additional elements passing from the interior to the exterior of the filter head. To mechanically interface a no filter element indicator to the apparatus for showing a dirty filter condition would be unduly complex. Applicants having invented an apparatus for causing a no filter condition indicator to indicate a dirty filter condition without mechanically interfacing the dirty filter indicating apparatus.

A bushing 22 is press fit into the outlet passage in the filter head extending downwardly into the center of the filter element. The filter element typically seals to the outer surface of the bushing or to a surface on the bottom of the filter head radially outward from the bushing.

According to this invention, a butterfly stopper 25 is secured within the bushing 22 and is moved to a closed position or actuated to an open position by linkages bearing upon a properly emplaced filter element.

Figure 3:
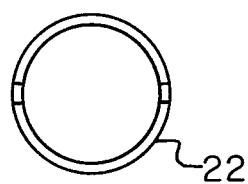
FIGS. 3 and 4 illustrate the bushing in detail.
Figure 4:
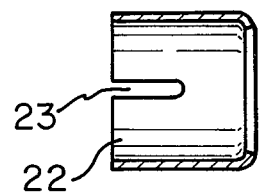
Figure 5:
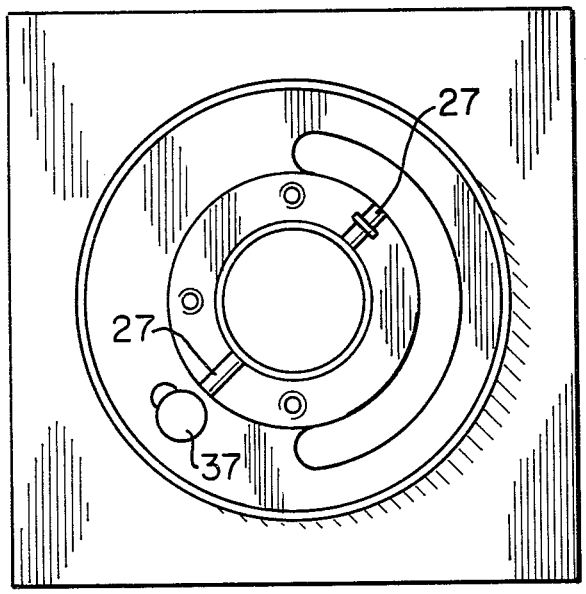
FIG. 5 is a bottom view of the filter head with a filter missing apparatus removed.
Figure 6:
FIGS. 6 and 7 illustrate the rod and stopper.
Figure 7:
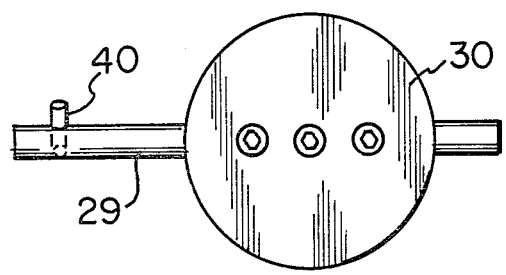
Figure 8:
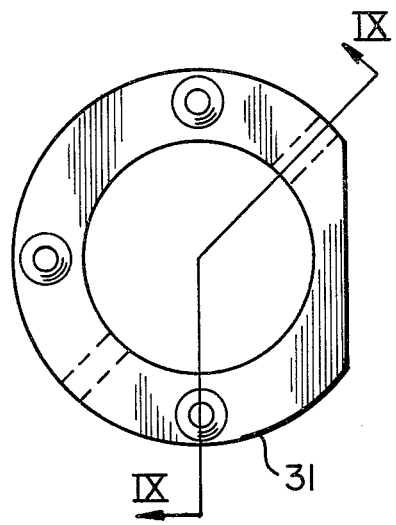
FIGS. 8 and 9 illustrate the annular plate.
Figure 9:
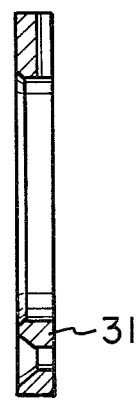

FIGS. 3 and 4 show a slot 23 extending from the bottom edge of the bushing. An identical slot is provided on the opposite side of the bushing. The slots extend just past the lower face of the filter head. They terminate in a hemicylindrical edge. The lower face (see FIG. 5) has hemicylindrical grooves 27 and the ends of the slots 23 coincide with the grooves. A rod 29 (see FIGS. 6 and 7) for supporting a butterfly stopper 30 is journaled in the grooves 27. An annular plate 31 (see FIGS. 8 and 9) has hemicylindrical grooves for fitting over the rod 29. The plate is secured to the bottom face of the filter head by fasteners, capturing the rod for rotation about its axis. The rod has an exposed end that extends away from the bushing 22.

Figure 2:
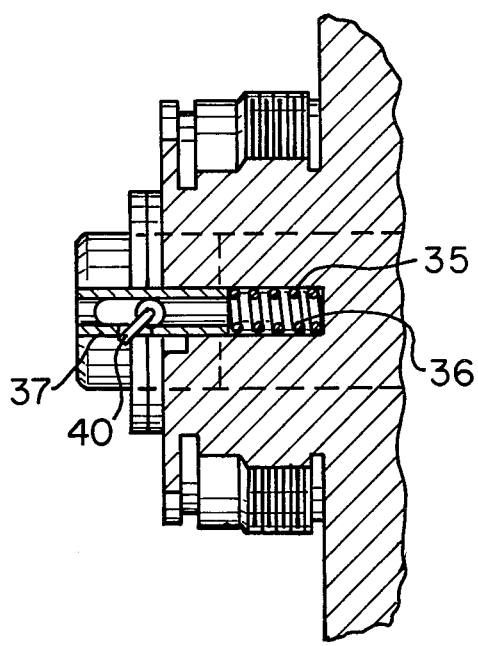
FIG. 2 is a broken away section of the lower face of the filter head illustrating the canister bushing and butterfly stopper.

A bore 35 extends into the filter head and receives a spring 36 and plunger 37. The spring biases the plunger out of the bore 35. (See FIG. 2) The plunger has a hollow cylindrical configuration with two opposed elongate openings 38 in the walls thereof perpendicular to the axis of the plunger for receiving the exposed end of the rod. The extent of the plunger's free travel is restricted by the length of the elongate openings. A short opening 39 in the wall of the plunger is perpendicular to both the axis of the plunger and the axis of the rod. The short opening receives a lever pin 40 that is fixed in the rod. Thus the movement of the plunger changes the angular position of the lever and rod because the edges of the short opening bear upon the outer end of the pin. The bottom face of the filter head is configured to allow free travel of the lever pin. The butterfly closure is rotated to the open position when the plunger is pushed into the bore 35. The length of the plunger is such that when a filter element is installed into the filter, the filter element moves the plunger to cause the butterfly closure to rotate to the open position. When a filter element does not bear upon the plunger, the butterfly closure springs to the closed position. The closed position may be established by a small pin extending into the bushing 22 to restrict the further rotation of the butterfly closure.

In the closed position, the butterfly closure provides sufficient resistance to the flow through the filter to cause the dirty filter indicator to automatically move to the alarm position.

Having thus described the invention with the detail and particularity required by the Patent Laws, what is desired protected and claimed by Letters Patent is set forth in the following claims:

1. A filter comprising
a filter head;
a canister secured to the filter head;
means for securing a tubular filter within the canister;
said filter head comprising inlet and outlet ports for connecting into a hydraulic conduit, a first passage for normally delivering fluid from the inlet port to the outer cylindrical surface of the tubular filter element and a second passage for delivering fluid from the interior of the filter element to the outlet port;
said filter head having a sliding element in between the inlet and outlet ports, said element being spring biased which bias can be overcome by differential pressure across the filter element;
means associated with said sliding element and extending through the filter head to the exterior thereof for indicating the position thereof;
said filter head having a butterfly valve in said second passage, plunger means slidably positioned in said filter head being spring biased to a first position in which it extends into the canister in the space normally occupied by the tubular filter element, a linkage between the butterfly valve and the plunger means to close the valve when the plunger is in its first position, and to open the valve when the plunger is forced in a second position by normal placement of a filter element.

2. A filter comprising
a filter head;
a canister secured to the filter head;
means for securing a tubular filter within the canister;
said filter head comprising inlet and outlet ports for connecting into a hydraulic conduit, a first passage for normally delivering fluid from the inlet port to the outer cylindrical surface of the tubular filter element and a second passage for delivering fluid from the interior of the filter element to the outlet port;
said filter head having a normally closed bypass valve in a channel between the inlet and outlet ports;
said bypass valve comprising a closure element that is spring biased in the closed position which bias can be overcome by differential pressure across the filter element;
means associated with said bypass valve and extending through the filter head to the exterior thereof for indicating the position thereof;
said filter head having a butterfly valve in said second passage, plunger means slidably positioned in said filter head being spring biasd to a first position in which it extends into the canister in the space normally occupied by the tubular filter element, a linkage between the butterfly valve and the plunger means to close the valve when the plunger is in its first position, and to open the valve when the plunger is forced in a second position by normal placement of a filter element.

* * * * *